March 10, 1931.  C. M. ELLENBERGER  1,796,194
FENDER WELL TIRE LOCK
Filed Jan. 4, 1929  2 Sheets-Sheet 1

Inventor
C. M. ELLENBERGER
By Bacon & Thomas
Attorney

March 10, 1931. C. M. ELLENBERGER 1,796,194
FENDER WELL TIRE LOCK
Filed Jan. 4, 1929 2 Sheets-Sheet 2
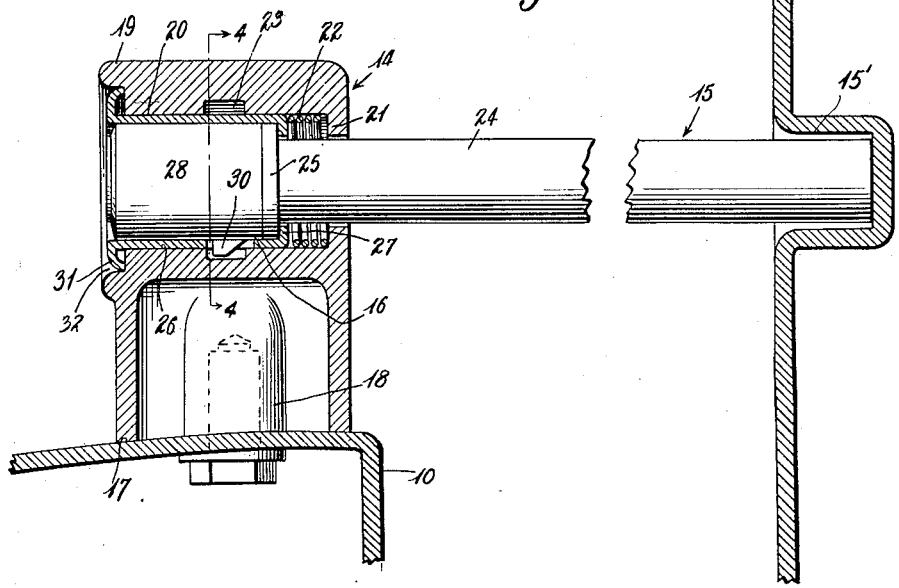
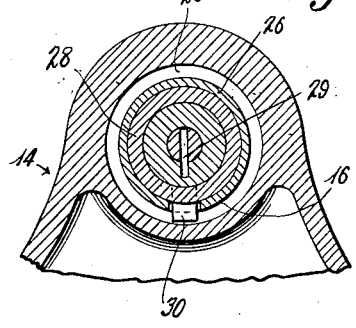
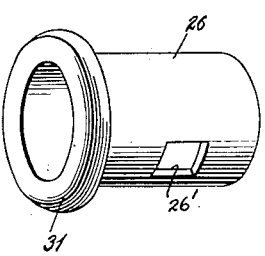
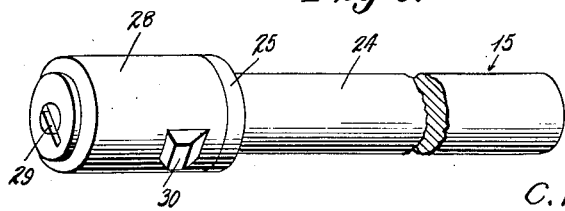
Inventor
C. M. ELLENBERGER
By Bacon & Thomas
Attorneys Patented Mar. 10, 1931

1,796,194

UNITED STATES PATENT OFFICE

CLARENCE M. ELLENBERGER, OF DETROIT, MICHIGAN, ASSIGNOR, BY MESNE ASSIGNMENTS, TO OAKES PRODUCTS CORPORATION, A CORPORATION OF MICHIGAN

FENDER-WELL TIRE LOCK

Application filed January 4, 1929. Serial No. 330,251.

This invention relates to fender well tire locks, of the type adapted for securing in position spare tires, rims, or wheels, of automobiles having their front fenders provided with wells to receive the spare tires.

The object of the invention is to provide a device of the character described which will be simple in construction and convenient in operation, consisting of a minimum number of parts, and well adapted for the purpose described.

Other objects and features of novelty will be apparent as the following description proceeds, as taken in conjunction with the accompanying drawings, in which:

Fig. 3 is a vertical section taken along line 3—3 of Fig. 2;

Fig. 4 is a vertical section taken along line 4—4 of Fig. 3;

Fig. 5 is a detail perspective view of a sleeve for the bolt; and

Fig. 6 is a perspective view of the locking bolt.

Figures 1, 2:
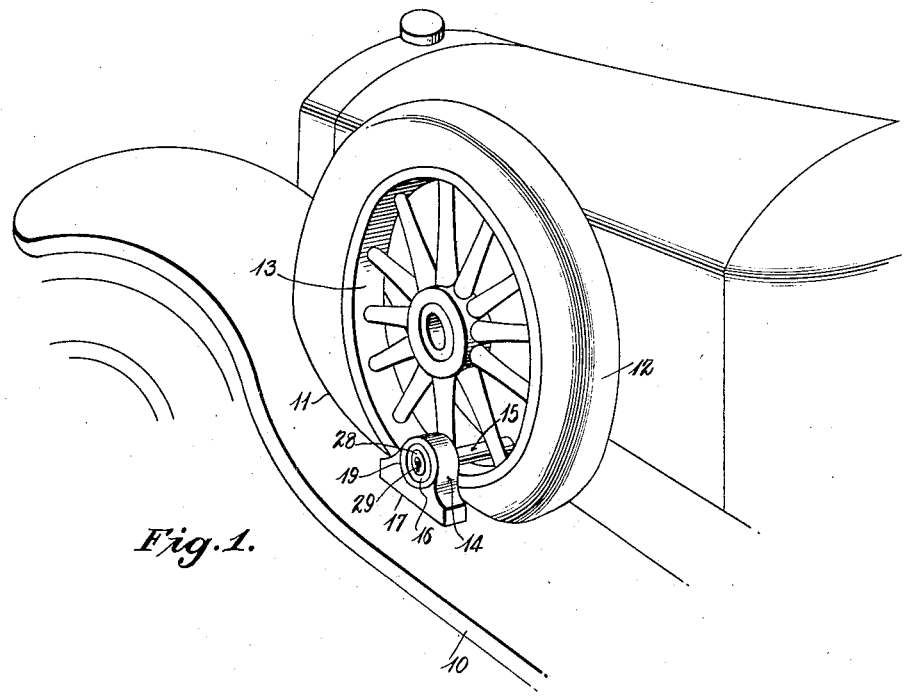
Fig. 1 is a perspective view of a spare tire mounted in a fender well, and secured in place by a lock according to the present invention.
Fig. 2 is an elevation of the lock housing.

Spare tires of many automobiles are mounted forward, and the front fenders are provided with fender wells which receive the lower portion of the tire. The expedients heretofore devised for locking spare tires in position are not adaptable to this arrangement, inasmuch as there is often no tire carrier other than the fender well. The present invention provides a very simple and practical means of securing spare tires carried in fender wells.

Referring more particularly to the drawings, the fender 10 is provided with a well 11, which is a depression formed in the upper surface of the fender and shaped to conform to the contour of the outer surface of the inflated tire. In Fig. 1 the tire 12 is shown as seated in the well 11, the tire being mounted on a spare rim 13.

Some automobiles are provided with spare wheels as well as rims and tires, and the present invention is equally adapted to this arrangement, as the securing elements may pass through the spokes of a wire or wooden wheel. The securing means according to the present invention comprises a housing 14 which is rigidly and permanently secured to the fender at or near the outer margin of the fender well, and a securing member 15 supported by the housing 14 and projecting transversely of the fender well and overlying the tire therein. Lock mechanism 16 is provided to secure the parts in position, and it will be recognized that with only two major parts, the housing 14 and the member 15, spare tires of the type supported by the fender wells may be securely locked in position. The member 15 projects the greater part of the way across the fender well, and is located only a slight distance above the upper margin of the fender well, so that when the member 15 is locked in position it is impossible to remove the tire from the fender well.

If desired, a suitable retainer or socket member may be mounted on the inner side of the fender well, in position to receive the inner end of the member 15. This retainer may be generally similar to the housing 16, but may be of simpler construction, with a smooth bore or socket, such as shown at 15' in Fig. 3.

The housing 16 is shown in more detail in Figs 2 and 3, and in the embodiment shown, comprises a casting having a lower surface 17 shaped to conform to the upper surface of the fender near the outer margin of the fender well. The casting may be cored out, but is provided with internal bosses 18 drilled and tapped to receive bolts by which the casting may be bolted to the fender. Of course, riveting and welding are alternative forms of securing the casting or housing to the fender within the purview of the present invention.

The upper portion of the housing 16 constitutes a horizontal boss 19 having a central aperture or bore 20. The inner end of the bore 20 is of reduced diameter forming a shoulder 21, which serves to retain a coil spring 22 housed within the bore. Substantially midway of the bore 20 an annular recess 23 is provided.

The securing means is shown in detail in

Figs. 4, 5 and 6, and comprises essentially a bolt 24. As the bolt 24 and the outer surface of the portion 16 are both exposed, they may be plated, or otherwise finished to protect them from the weather as well as to present a pleasing appearance. The bolt 24 has an enlarged head 25 which is housed in a sleeve 26, and retained in position by an inwardly extending flange 27. The remaining interior portion of the sleeve is occupied by a lock cylinder 28 containing tumblers, or other mechanism whereby the cylinder can be operated only by the insertion of a key in the slot 29. The cylinder 28 controls the operation of a spring pressed detent 30 projecting outwardly from the sleeve 26 through the slot 26'.

The securing member shown in Figs. 4, 5 and 6 is adapted to enter the bore 20 in the housing shown in Figs. 2 and 3. The bolt 24 will pass through the central aperture of the shoulder 21 and the flange 27 will abut the outer end of the spring 22 and compress it until the detent 30 lodges in the annular channel 23. The sleeve 26 will occupy the remaining portion of the bore 20, and the rolled flange 31 thereof will fit in the annular recess 32 surrounding the outer end of the bore 20. It should be noted that the recess 32 and the flange 31 provide an offset which prevents the insertion of instruments in an endeavor to pick the lock.

In operation, assuming that the parts are in the position shown in Fig. 1, and it is desired to unlock the device to remove the tire, the key is inserted in the slot 29 and turned, so that the cylinder 28 withdraws the detent 30 from the annular recess 23. The bolt may now be withdrawn until its inner end is substantially flush with the inner face of the casting 16, or it may be bodily removed. This permits the tire to be lifted bodily out of the fender well. It should be noted that the spring 22 is of advantage to project the flange 31 out of the recess 32 a distance sufficient to permit the operator to grasp the sleeve 26 for removing the bolt.

When the tire is replaced in the fender well, it may be securely locked in position by merely replacing the securing member in the bore 20. The spring detent 30 will snap into the annular channel 23, and effectually prevent unauthorized removal of any of the parts.

While one embodiment of the invention has been shown and described in great detail for the purposes of applicant's disclosure, the invention is not limited to any of the details shown and described, but includes such modifications and embodiments of the broad idea as come within the scope of the subjoined claims.

Having thus described the invention, what I claim as new and desire to secure by Letters Patent of the United States is:

1. In a fender well spare tire lock, a member adapted to be secured to the fender at one side of the well, a horizontal aperture in said member, a bolt member slidable in said aperture, an abutment in said aperture to limit the sliding movement of said bolt member, a shoulder on said bolt member and a compression spring interposed between said shoulder and said abutment, one of said members carrying a spring pressed detent, and the other having a notch receiving said detent and lock mechanism for releasing said detent.

2. In a fender well spare tire lock, a pair of members adapted to be secured to the fender one at each side of the well, a horizontal aperture in one member, a bolt slidable in said aperture to project across the well into engagement with the other member, an abutment in said aperture to limit the sliding movement of the bolt, a shoulder on the bolt, a compression spring interposed between the shoulder and said abutment, one of said members carrying a detent and the other having a notch receiving said detent, and lock mechanism for operating said detent.

3. In a fender well spare tire lock, a pair of members adapted to be secured to the fender one at each side of the well, a bolt slidably supported by the two members crosswise of the well, the bolt and one of said members being provided with a coacting detent and notch adapted to secure the bolt against sliding movement, and a lock mechanism for operating the detent whereby to free the bolt for sliding movement relative to the two members.

4. In a fender well spare tire lock, a pair of members adapted to be secured to the fender one at each side of the well, a bolt slidably supported by the two members crosswise of the well, the bolt and one of said members being provided with a co-acting detent and notch adapted to secure the bolt against sliding movement, a lock mechanism for operating the detent whereby to free the bolt for sliding movement relative to the two members, and a spring exerting opposing thrust forces on the bolt and one member adapted upon release of the detent to shift the bolt in one direction.

In testimony whereof I affix my signature.

CLARENCE M. ELLENBERGER.